United States Patent [19]

Beijleveld et al.

[11] Patent Number: 4,774,293

[45] Date of Patent: Sep. 27, 1988

[54] PROCESS FOR CROSS-LINKING OR DEGRADING POLYMERS AND SHAPED ARTICLES OBTAINED BY THIS PROCESS

[75] Inventors: Wilhelmus M. Beijleveld, Olst; Johannes P. J. Verlaan, Deventer, both of Netherlands

[73] Assignee: Akzo N.V., Arnhem, Netherlands

[21] Appl. No.: 869,246

[22] Filed: Jun. 2, 1986

[30] Foreign Application Priority Data

Jun. 26, 1985 [NL] Netherlands ............... 8501833

[51] Int. Cl.⁴ .................................. C08F 261/02
[52] U.S. Cl. .................... 525/298; 525/88; 525/95
[58] Field of Search ....................... 525/298

[56] References Cited

U.S. PATENT DOCUMENTS 3,622,636  11/1971  Krimm et al. ............... 252/8.5
3,980,629  9/1976  Sacrini et al. ............... 525/298

FOREIGN PATENT DOCUMENTS 60-011349  7/1983  Japan .
60-13828   1/1985  Japan .
60-19762   1/1985  Japan .
8002285    4/1979  PCT Int'l Appl. .
757529     6/1978  U.S.S.R. .
887578     3/1980  U.S.S.R. .

OTHER PUBLICATIONS

Chemical Abstracts, vol. 102 (1985), Abstract No. 203721h.

Primary Examiner—Joseph L. Schofer
Assistant Examiner—Bernard Lipman
Attorney, Agent, or Firm—Parkhurst, Oliff & Berridge

[57] ABSTRACT

This disclosure relates to a process for cross-linking polymers, e.g. polyethylene, or degrading polymers, e.g. polypropylene, using peroxides having at least one carbon-carbon double bond in the molecule, e.g. 1-(t-butyl peroxy isopropyl)-3-isopropenylbenzene.

Incorporation of the peroxides into the polymer may be carried out at relatively high temperatures without the risk of premature decomposition of the peroxide, thus allowing easy processability of the polymer mass prior to cross-linking or degradation. The polymeric end products obtained are odorless and do not display blooming.

6 Claims, No Drawings

PROCESS FOR CROSS-LINKING OR DEGRADING POLYMERS AND SHAPED ARTICLES OBTAINED BY THIS PROCESS

BACKGROUND OF THE INVENTION

A. Field of the Invention

The invention relates to a process for cross-linking or degrading polymers, use being made of an organic peroxide which has at least one carbon-carbon double bond in the molecule. The invention also relates to shaped articles obtained by this process.

B. Description of the Related Art

A process of the above type is disclosed in U.S. Pat. No. 3,980,629. According to it the use as cross-linking agent of unsaturated peroxyketals leads to cross-linked polymers that are practically odourless and do not exhibit blooming.

Polymers having those properties are desirable in that, as is generally known, the more or less volatile decomposition products formed from dicumyl peroxide, which is often used in practice for cross-linking and degradation purposes, will lead to polymers which have an unpleasant smell and display blooming, which is objectionable to their applicability, for instance as packaging material for foodstuffs.

To the peroxyketals described in the above U.S. Patent, however, there is the disadvantage that the temperature at which they are incorporated into a polymer is subject to restrictions in view of the risk of premature decomposition. They are therefore not suitable at all to be used as a degradant for polymers such as polypropylene. When they are used as a cross-linking agent, this drawback manifests itself particularly in the cross-linking of those polymers, such as elastomers, into which the peroxide, and other additives, if desired, are to be mixed in at elevated temperature, prior to the polymer mass being shaped, to prevent premature cross-linking (scorching). The temperature at which these well-known peroxides are allowed to be processed is relatively low, which is detrimental to the viscosity and, hence, the processability of the polymer mass to be cross-linked. Therefore, as cross-linking agents these peroxyketals are no satisfactory alternative to dicumyl peroxide.

SUMMARY OF THE INVENTION

The invention envisages the elimination of these drawbacks. It provides peroxides that are not subject to the temperature limitations of said peroxyketals, but do retain the favourable properties of these peroxyketals with respect to smell and blooming of the polymeric endproducts (see above) and as cross-linking and degrading agents form a good alternative to dicumyl peroxide.

The process according to the invention is characterized in that the peroxide corresponds to the general structural formula

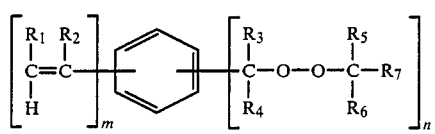

(I)

where
m = 0, 1 or 2;
n = 1, 2 or 3;
m + n ≦ 3;
$R_1$ = H or an alkyl group containing 1–3 carbon atoms;
$R_2$ = an alkyl group containing 1–4 carbon atoms;
$R_3$–$R_6$ = alkyl groups containing 1–10 carbon atoms;
$R_7$ = an alkyl group containing 1–10 carbon atoms which may be substituted with a $C_{1-10}$ alkoxy group, a $C_{1-10}$ acetoxy group or a hydroxyl group, or represents a group A of the general formula

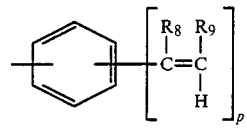

where p = 1 or 2 and $R_8$ and $R_9$ have the meaning indicated above for $R_2$ and $R_1$, respectively; and in the case of disubstitution the aromatic ring substituents are not ortho to each other and in the case of trisubstitution are not in three adjacent positions, and that when m = 0, $R_7$ represents a group A.

It should be noted that several of the peroxides to be used according to the present invention are known from Soviet Union Pat. No. 757,529, Soviet Union Pat. No. 887,578, Japanese Pat. No. 60/11349, Japanese Pat. No. 60/13828 and Japanese Pat. No. 60/19762. It is described that those peroxides may be applied as monomers in the preparation of peroxide groups-containing polymers. The present use is neither disclosed in these publications nor can it be derived therefrom.

It should further be noted that for the use as cross-linking agent for rubber an unsaturated peroxide is known from WP No. 8,002,285, viz. 1-methacrylate-1-t-butyl peroxyethane. Upon repetition of a process on the basis of the data known from this disclosure, however, it was not found possible to prepare this peroxide.

Cross-linking of polymers

As mentioned above, the present peroxides may with advantage be used in high-melting polymers, such as elastomers, without the risk of premature cross-linking during the processing phase, i.e. the phase of mixing in of the peroxide and moulding of the polymer mass immediately preceding the cross-linking phase. As examples of these polymers may be mentioned: polyethylene, copolymers of ethylene and propylene (EPM) and copolymers of ethylene, propylene and a diene monomer (EPDM). But the advantages to the present peroxide are not limited to use in high-melting polymers. The present peroxides also may with advantage be used in low-melting polymers.

As a result, the polymer mass obtained may advantageously be exposed to relatively high temperatures, so that a low viscosity and, hence, satisfactory processability are obtained.

Examples of polymers to be cross-linked in accordance with the present process, in addition to the polymers mentioned before, include chlorosulphonated polyethylene, chlorinated polyethylene, polybutene-1, polyisobutene, ethylene vinyl acetate copolymers, polybutadiene, polyisoprene, polychloroprene, butadiene styrene copolymers, natural rubber, polyacrylate rubber, butadiene acrylonitrile copolymers, acrylonitrile-butadiene-styrene terpolymers, silicon rubber, polyurethanes and polysulphides.

It is preferred that the present process should be applied for cross-linking polyethylene, EPM and EPDM.

To the polymer to be cross-linked is generally added 0.1-10% by weight, and preferably 1-3% by weight of the present peroxide.

Moreover, to the polymer to be cross-linked there may be added various agents commonly employed in cross-linking processes, such as antioxidants, pigments, UV stabilizers, fillers, plasticizers, etc. in amounts commonly used for these purposes.

The temperature at which the present peroxides may be mixed into polymeric material without there occurring any premature cross-linking is generally in the range of 25° to 130° C.; the temperature at which subsequent cross-linking is carried out is generally in the range of 150° to 220° C., preferably 160°-190° C.

For carrying out the process according to the invention use may be made of the techniques commonly applied in cross-linking reactions in appropriate equipment.

In this connection mention is made of the known fact that cross-linked polyethylene is a very suitable material to be applied as insulating material in the wire and cable industry.

DEGRADATION OF POLYMERS

As is known for cases where easy processing is required, as in melt spinning at high shear rates, propylene-based polymers prepared by the Ziegler-Natta process should be degraded, because of a too high molecular weight and hence a too high viscosity. By heating the polymer to a temperature in the range of 180° to 350° C. in the presence of a radical initiating compound a reduction of the molecular weight and a narrowed molecular weight distribution are obtained. Polymers thus degraded satisfy the requirements of ease of processing to be met in the production of fibres, films and other shaped articles.

The present peroxides have been found very suitable degradants. As polymers that lend themselves to be degraded may be mentioned the well-known (co)-polymers of propylene; polypropylene and copolymers of propylene and ethylene, 1-butene or 1-hexene. In actual practice it is mostly the degradation of polypropylene that is applied.

Degradation may be carried out in the usual manner. In the presence of one of the present peroxides, the (co)polymer is heated to a temperature above the melting point of the (co)polymer and above the decomposition temperature of the peroxide. This temperature will generally be in the range of 180° to 350° C., preferably 200° to 250° C. The heating time is as a rule between 0.1 and 30 minutes, preferably between 0.5 and 5 minutes.

The present peroxide will generally be added to the (co)polymer to be degraded in an amount of 0.001 to 2% by weight, preferably 0.01 to 0.5% by weight, calculated on the amount of (co)polymer. In addition antioxidants and/or UV stabilizers, usually employed for polymer degradation, may be added in the usual amount to the (co)polymer to be degraded. As examples of suitable antioxidants may be mentioned esters of $\beta$-(3,5-di-tert.butyl-4-hydroxyphenyl)propionic acid, more particularly the esters thereof with pentaerythrite or octadecanol, 1,3,5-trimethyl-2,4,6-tris(3',5'-di-tert.-butyl-4'-hydroxyphenyl)benzene, 4-hydroxymethyl-2,6-di-tert.butylphenol, tris-(2'-methyl-4'-hydroxy-5'-tert.butylphenyl)butane, tetrakis[3-(3,5-di-tert.butyl-4-hydroxyphenyl)propionyloxymethyl]methane, 2,6-di-tert.butyl-p-cresol and 3,5-dimethyl-4-hydroxybenzyl thioglycolic stearyl ester. As suitable UV rays absorbing agents may be mentioned 2-(2'-hydroxy-3',5'-di-tert.amylphenyl)benzotriazole, 2-(2'-hydroxy-3',5'-di-tert.butylphenyl)-5-chlorobenzotriazole and 2-hydroxy-4-n-octyl-oxy-benzophenone.

The degradation may be carried out in equipment usually employed for this purpose, such as extrusion apparatus.

THE PRESENT PEROXIDES

The peroxides to be used according to the invention correspond to the above-described general Formula I. For practical considerations with regard to the magnitude of the molecular weight and synthetic accessibility it is preferred that when m=1 or 2 and/or p=1 or 2 use should be made of peroxides where the substituted vinyl group or groups represent isopropenyl ($R_1$=H, $R_2$=$CH_3$ and/or $R_8$=$CH_3$, $R_9$=H) and the aromatic radical or radicals represent the cumyl structure ($R_3$=$R_4$=$CH_3$ and/or $R_5$=$R_6$=$CH_3$).

The preparation may be carried out in the usual manner by reacting a t-alcohol with hydrogen peroxide in an acid medium to form the corresponding t-alkylhydroperoxide and converting the resulting compound with a t-alcohol, also in an acid medium, into the peroxide; at least one of the two t-alcohols used should be unsaturated.

Examples of saturated t-alcohols to be used in the preparation of the present peroxides include t-butyl alcohol, t-amyl alcohol, 2-hydroxy-2-methylpentane, cumyl alcohol, (=$\alpha$-hydroxyisopropylbenzene), 1,3-bis($\alpha$-hydroxyisopropyl)benzene, 1,4-bis($\alpha$-hydroxyisopropyl)benzene and 1,3,5-tris-($\alpha$-hydroxyisopropyl)benzene.

Examples of unsaturated t-alcohols to be used in the preparation of the present peroxides include 1-($\alpha$-hydroxyisopropyl)-3-isopropenylbenzene, 1-($\alpha$-hydroxyisopropyl)-4-isopropenylbenzene, 1-($\alpha$-hydroxyisopropyl)-3,5-bis-(isopropenyl)benzene, 1,3-bis($\alpha$-hydroxyisopropyl)-5-isopropenylbenzene and 1-($\alpha$-hydroxyisopropyl)-2,4-bis(isopropenyl)benzene. Preparation of these unsaturated t-alcohols may be carried out by partial dehydration of the corresponding diols or triols in the manner described in U.S. Pat. No. 3,622,636 for the preparation of 1-($\alpha$-hydroxyisopropyl)-3-isopropenylbenzene and 1-($\alpha$-hydroxyisopropyl)-4-isopropenylbenzene from, respectively, 1,3-bis($\alpha$-hydroxyisopropyl)benzene and 1,4-bis($\alpha$-hydroxyisopropyl)benzene.

Examples of suitable peroxides where in the general Formula I m=0 are:

1-(cumyl peroxy isopropyl)-3-isopropenylbenzene and
1-(cumyl peroxy isopropyl)-4-isopropenylbenzene.

Examples of suitable peroxides where in the general Formula m≠0 are:

1-(t-butyl peroxy isopropyl)-3-isopropenylbenzene,
1-(t-butyl peroxy isopropyl)-4-isopropenylbenzene,
1,3-di(t-amyl peroxy isopropyl)-5-isopropenylbenzene,
1-(t-butyl peroxy isopropyl)-3,5-bis(isopropenyl)benzene,
1-(t-butyl peroxy isopropyl)-2,4-bis(isopropenyl)benzene and
1,3-di(t-butyl peroxy isopropyl)-5-isopropenylbenzene.

Particularly suitable for use in the process according to the invention are those peroxides where m has the value of 1 and, when $R_7$ represents the group A, p also has the value of 1. More particularly preferred are those peroxides where $R_1=H$, $R_2=R_3=R_4=R_5=R_6=a$ methyl group and, when $R_7$ represents a group A, $R_8=$ a methyl group and $R_9=H$.

The present peroxides also may be used in combination with each other.

As regards the structure of the present peroxides it should still be noted that steric requirements lead to the aromatic substituents not being ortho to each other in the case of disubstitution and to their not being in three adjacent positions in the case of trisubstitution. The invention will be further described in the following examples.

EXAMPLE 1

Preparation of 1-(t-butyl peroxy isopropyl)-3-isopropenylbenzene (Compound 1)

To a mixture of equimolar amounts of t-butyl hydroperoxide (32 g) and 1-(α-hydroxyisopropyl)-3-isopropenylbenzene (57 g) stirred at 30° C. there were added 1.32 ml of an aqueous solution of 20% by weight of perchloric acid. Over a period of 30 minutes $MgSO_4.2H_2O$ was added portionwise up to an amount of in all 26.3 g, after which the reaction mixture was stirred for 2 hours at 35° C. Then sufficient water was added to dissolve all of the magnesium sulphate. The organic phase was separated, washed with aqueous NaOH and finally with water. Obtained were 80 g of a colourless liquid (yield 90%) having an active oxygen content of 6.02% (calc. 6.44%). The structure was confirmed by NMR and IR analyses.

EXAMPLE 2

Preparation of 1-(t-butyl peroxy isopropyl)-4-isopropenylbenzene (Compound 2)

The same procedure was carried out as described in Example 1, except that use was made of equimolar amounts of 1-(α-hydroxyisopropyl)-4-isopropenylbenzene and t-butyl hydroperoxide. Obtained was a colourless liquid (yield 90%) having an active oxygen content of 5.58% (calc. 6.44%). The structure was confirmed by NMR and IR analyses.

EXAMPLE 3

Preparation of Compound 3

The same procedure was carried out as described in Example 1, except that use was made of equimolar amounts of 1-(α-hydroxyisopropyl)-3-isopropenylbenzene and 1-(α-hydroperoxyisopropyl)-3-isopropenylbenzene. Obtained was a colourless liquid (yield 70%) having an active oxygen content of 3.81% (calc. 4.56%). The structure was confirmed by NMR and IR analyses.

EXAMPLE 4

Preparation of Compound 4

The same procedure was employed as described in Example 1, except that use was made of equimolar amounts of 1-(α-hydroxyisopropyl)-4-isopropenylbenzene and 1-(α-hydroperoxyisopropyl)-4-isopropenylbenzene. Obtained was a viscous liquid from which the product was isolated as white crystals by crystallization with diethyl ether. The product was obtained in a yield of 60% and had a melting point of 82°–85° C. and an active oxygen content of 4.20% (calc. 4.56%). The structure was characterized by NMR and IR analyses.

EXAMPLE 5

Preparation of 1-(cumyl peroxy isopropyl)-4-isopropenylbenzene (Compound 5)

The same procedure was used as described in Example 4, except that use was made of equimolar amounts of 1-(α-hydroxyisopropyl)-4-isopropenylbenzene and cumyl hydroperoxide. Obtained were white crystals (yield 70%) having a melting point of 40° C. and an active oxygen content of 4.34% (calc. 5.15). The structure was confirmed by NMR and IR analyses.

EXAMPLE 6

Preparation of 1,3-di-(t-butyl peroxy isopropyl)-5-isopropenylbenzene (Compound 6)

To a mixture of 1,3-bis(α-hydroxyisopropyl)-5-isopropenylbenzene (14 g), t-butyl hydroperoxide (15 g) and hexane (50 ml) stirred at 35° C. there were added 0.55 ml of an aqueous solution of 20% by weight of perchloric acid and subsequently $MgSO_4.2H_2O$ (10.6 g), the latter in a portionwise manner, after which the reaction mixture was stirred for 3 hours at 40° C. Then sufficient water was added to dissolve all of the magnesium sulphate. The organic phase was separated, washed with aqueous NaOH and finally with water. After removal of the hexane from the organic phase under reduced pressure, 22 g of a yellow oil were obtained (yield 95%) having an active oxygen content of 8.29% (calc. 8.47%). The structure was confirmed by NMR and IR analyses.

EXAMPLE 7

Preparation of 1-(t-butyl peroxy isopropyl)-3,5-bis(isopropenyl)benzene (Compound 7)

The same procedure was employed as described in Example 1, except that use was made of equimolar amounts of 1-(α-hydroxyisopropyl)-3,5-bis(isopropenyl)benzene and t-butyl hydroperoxide. Obtained was a yellow liquid (yield 95%) having an active oxygen content of 5.12% (calc. 5.56%). The structure was confirmed by NMR and IR analyses.

EXAMPLE 8

Of the peroxides described in the preceding examples the permissible processing temperature was determined as follows.

Over a period of 5 minutes 0.01 equivalent of the peroxide was mixed with 100 g of ethylene-propylene copolymer (EPM) on a roll mill at a friction of 1:1.2 and at a temperature of 50°–70° C. Of the resulting mixture the cross-linking behaviour was subsequently determined with the aid of a Göttfert Elastograph in the manner described in Kautschuk und Gummi 29(5/6) 341-352 (1976). In this determination the mixture to be cross-linked is embedded in a heated chamber the lower half of which is oscillatory. During cross-linking the increase is registered in the torque on the lower chamber half as a result of the increase in viscosity of the cross-linking mixture as a function of time. The increase in torque is expressed in the parameters $t_{10}$ and $t_{90}$ which represent the time necessary under the given conditions to bring about respectively 10% and 90% of the increase in torque (Δtorque). The determinations were carried out at 170° C., using being made of a slit width of 0.2 mm, an oscillation angle of about 0.5° and an oscillation frequency of 0.83 Hz. The results are given in Table 1. For comparison also the values are mentioned of analogous experiments carried out using 0.01 mole of dicumyl peroxide (Compound A) and 0.01 mole of 1-phenyl-3,3-di(t-butylperoxy)-1-propene (Compound B: an unsaturated peroxide according to U.S. Pat. No. 3,980,629).

From the $t_{10}$ and $t_{90}$ values found it appears that the processing range of the present peroxides is similar to that of dicumyl peroxide (A) and in several cases even exceeds it, whereas the processing range of the peroxide (B) disclosed in U.S. Pat. No. 3,980,629 is narrower.

TABLE 1

| Compound | $t_{10}$ (min) | $t_{90}$ min |
|---|---|---|
| 1 | 1.7 | 16 |
| 2 | 1.3 | 12 |
| 3 | 0.8 | 7 |
| 4 | 0.6 | 5 |
| 5 | 0.8 | 7 |
| 6 | 1.0 | 8 |
| 7 | 0.9 | 8 |
| A | 0.7 | 7 |
| B | 0.5 | 4 |

EXAMPLE 9

The peroxides described in Examples 1 and 6 were tested as cross-linking agent for polyethylene. To that end 0.01 equivalent of each peroxide was mixed on a roll mill for 3 minutes at 120°–130° C. with 100 g of low-density polyethylene (Lupolen®1810 H, ex BASF).

The cross-linking behaviour was determined with the aid of the Göttfert Elastograph described in Example 8. The $t_{10}$, $t_{90}$ and $\Delta$torque values obtained are listed in Table 2. The table also gives the compression moulding temperature and the compression moulding time applied in the cross-linking processes.

The cross-linked products obtained were tested for odour and blooming and the following properties were measured.

The tensile strength, the 100, 200 and 300% moduli and the elongation at break were determined in accordance with ISO-standard R37 type 1.

The hardness was determined in accordance with ASTM D2240.

The gel fraction was measured in conformity with the standards B5 5468-1977 and ANSI/ASTM D2765-68(1972). In this test the percentage polymer is determined which does not dissolve in boiling xylene under the test conditions. This parameter is a measure of the degree of cross-linking and hence of the efficiency of the peroxide.

The results are given in Table 2. It also mentions the results of a comparative experiment carried out with 0.01 mole of dicumyl peroxide (Compound A).

The results obtained show that the peroxides according to the invention are a good alternative to dicumyl peroxide. Furthermore the remarkably high value of $\Delta$torque obtained with Compound 6 should be noted. This high value is surprising in view of the fact that Compounds 1, 6 and A were used in equivalent amounts (i.e. 0.01 mole of Compounds 1 and A and 0.005 mole of Compound 6).

TABLE 2

| Compound | 1 | 6 | A |
|---|---|---|---|
| $t_{10}$ (min) | 1.2 | 1.3 | 1.1 |
| $t_{90}$ (min) | 8.2 | 8.7 | 8.8 |
| $\Delta$torque (Nm) | 0.51 | 0.67 | 0.48 |
| Compression moulding temp. (°C.) | 180 | 180 | 170 |
| Compression moulding time (min) | 20 | 20 | 20 |
| Tensile strength (MPa) | 21.5 | 19.7 | 19.7 |
| Modulus 100% (MPa) | 7.6 | 8.1 | 7.8 |
| Modulus 200% (MPa) | 7.9 | 8.6 | 8.2 |
| Modulus 300% (MPa) | 9.7 | 12.5 | 10.3 |
| Elong. at break (%) | 450 | 360 | 420 |
| Hardness Shore D | 49 | 45 | 49 |
| Gel fraction (%) | 86 | 88 | 90 |
| Odour | none | none | yes |
| Blooming after 1 week | none | none | yes |

To further demonstrate that the peroxides according to the invention have desirable properties as regards their decomposition products the following experiments were carried out.

Samples of the cross-linked products obtained in Example 9 were exhaustively extracted with dichloromethane at reflux temperature. Gas chromatographic analysis of the resulting solutions showed that no aromatic compounds were present in the solutions from the products prepared with Compounds 1 and 6 whereas in the solution from the product prepared with dicumyl peroxide (Compound A) acetophenone and cumyl alcohol could be clearly identified.

In another set of experiments the cross-linking reactions described in Example 9 were repeated, except that in stead of the Göttfert Elastograph use was made of a closed reaction vessel coupled to a gas chromatograph (head space gas chromatography). At regular time intervals gas samples from the reaction vessel were analyzed for aromatic decomposition products. In the case of Compounds 1 and 6 no aromatic decomposition products could be detected whereas in the case of dicumyl peroxide (Compound A) acetophenone and cumyl alcohol could be clearly identified.

EXAMPLE 10

The peroxide described in Example 1 was tested as degradant for polypropylene. The following procedure was used.

Unstabilized polypropylene (Moplen® FLS 20, ex. Himont; melt flow index (230° C., 2.16 kg): 1.8 g/10 min) was mixed with the peroxide in a tumble mixer. The resulting product was processed through a single screw extruder at elevated temperature. After cooling to room temperature, the extrudate was granulated and of the resulting granules the melt flow index was determined.

The amounts of peroxide used, the extrusion temperatures applied and the melt flow indices obtained are listed in Table 3. From the indices obtained it appears that the peroxide according to the invention is a suitable polypropylene degradant. In addition to this it was observed that the extrudate obtained was odourless whereas in a comparative experiment carried out with dicumyl peroxide as degradant an unpleasantly smelling extrudate resulted.

TABLE 3

| Amount of peroxide (wt. %) | Extrusion temp. (°C.) | Melt flow index (g/10 min) |
|---|---|---|
| 0.0171 | 200 | 5.7 (1) |
| 0.0171 | 250 | 8.2 (1) |
| 0.0855 | 200 | 28.1 (1) |
| 0.0855 | 250 | 35.1 (1) |
| 0.428 | 200 | 84.8 (2) |

TABLE 3-continued

| Amount of peroxide (wt. %) | Extrusion temp. (°C.) | Melt flow index (g/10 min) |
| --- | --- | --- |
| 0.428 | 250 | 209 (2) |

(1) Measuring conditions: 230° C./2.16 kg
(2) Measuring conditions: 190° C./2.16 kg

What is claimed is:

1. A process for cross-linking (co)polymers of ethylene and elastomers, comprising adding an effective amount of an organic peroxide to said (co)polymers of ethylene and elastomers, said organic peroxide comprising at least one carbon-carbon double bond and corresponding to the formula:

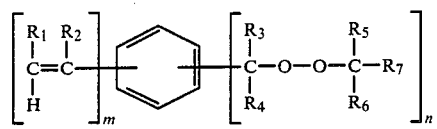
(I)

where
$m = 0$, 1 or 2;
$n = 1$, 2 or 3;
$m + n \leq 3$;
$R_1$ is selected from the group consisting of a hydrogen atom and an alkyl group containing 1–3 carbon atoms;
$R_2$ is an alkyl group containing 1–4 carbon atoms;
$R_3$–$R_6$ are alkyl groups containing 1–10 carbon atoms;
$R_7$ is selected from the group consisting of an alkyl group containing 1–10 carbon atoms substituted with a $C_{1-10}$ alkoxy group, a $C_{1-10}$ acetoxy group or a hydroxyl group, an alkyl group containing 1–10 carbon atoms and a group A of the formula

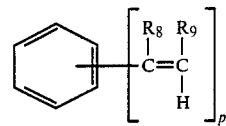

wherein $p = 1$ or 2 and $R_8$ and $R_9$ are equivalent to $R_2$ and $R_1$, respectively; and wherein in a case of disubstitution, aromatic ring substituents are not ortho to each other; in a case of trisubstitution, said substituents are not in three adjacent positions, and when $m = 0$, $R_7$ represents the group A.

2. A process according to claim 1, wherein $m = 1$ and when $R_7$ is the group A, $p = 1$.

3. A process according to claim 2, wherein $R_1 = H$, $R_2 = R_3 = R_4 = R_5 = R_6 =$ a methyl group and when $R_7$ is the group A, $R_8 =$ a methyl group and $R_9 = H$.

4. A process according to claim 1, wherein said (co)polymers of ethylene are cross-linked.

5. Shaped articles comprising cross-linked (co)polymers of ethylene or elastomers obtained from the process according to claim 1.

6. A process according to claim 1, wherein said elastomers are cross-linked.

* * * * *

UNITED STATES PATENT AND TRADEMARK OFFICE
CERTIFICATE OF CORRECTION

PATENT NO. : 4,774,293

DATED : September 27, 1988

INVENTOR(S) : Wilhelmus M. BEIJLEVELD et al

It is certified that error appears in the above-identified patent and that said Letters Patent is hereby corrected as shown below:

Column 2, line 67, change "silicon" to --silicone--.

Column 3, line 43, change "propylene;" to --propylene:--.

Column 6, line 11, change "5.15)." to --5.15%).--.

Column 7, line 27, change "agent" to --agents--.

Column 8, line 30, change "in stead" to --instead--; change "G,öttfert" to --Göttfert--.

UNITED STATES PATENT AND TRADEMARK OFFICE
CERTIFICATE OF CORRECTION

PATENT NO. : 4,774,293

DATED : September 27, 1988

INVENTOR(S) : Wilhelmus M. BEIJLEVELD et al

It is certified that error appears in the above-identified patent and that said Letters Patent is hereby corrected as shown below:

Column 10, in claim 1, change the formula to read as follows:

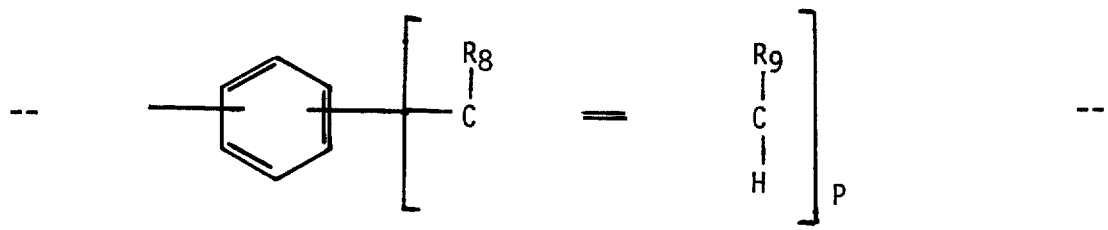

Signed and Sealed this

Eleventh Day of April, 1989

Attest:

DONALD J. QUIGG

Attesting Officer

Commissioner of Patents and Trademarks